Feb. 4, 1958 A. W. LUNDELL 2,822,011
END WEIGHT FOR SLICING MACHINE
Filed June 1, 1956 3 Sheets-Sheet 1
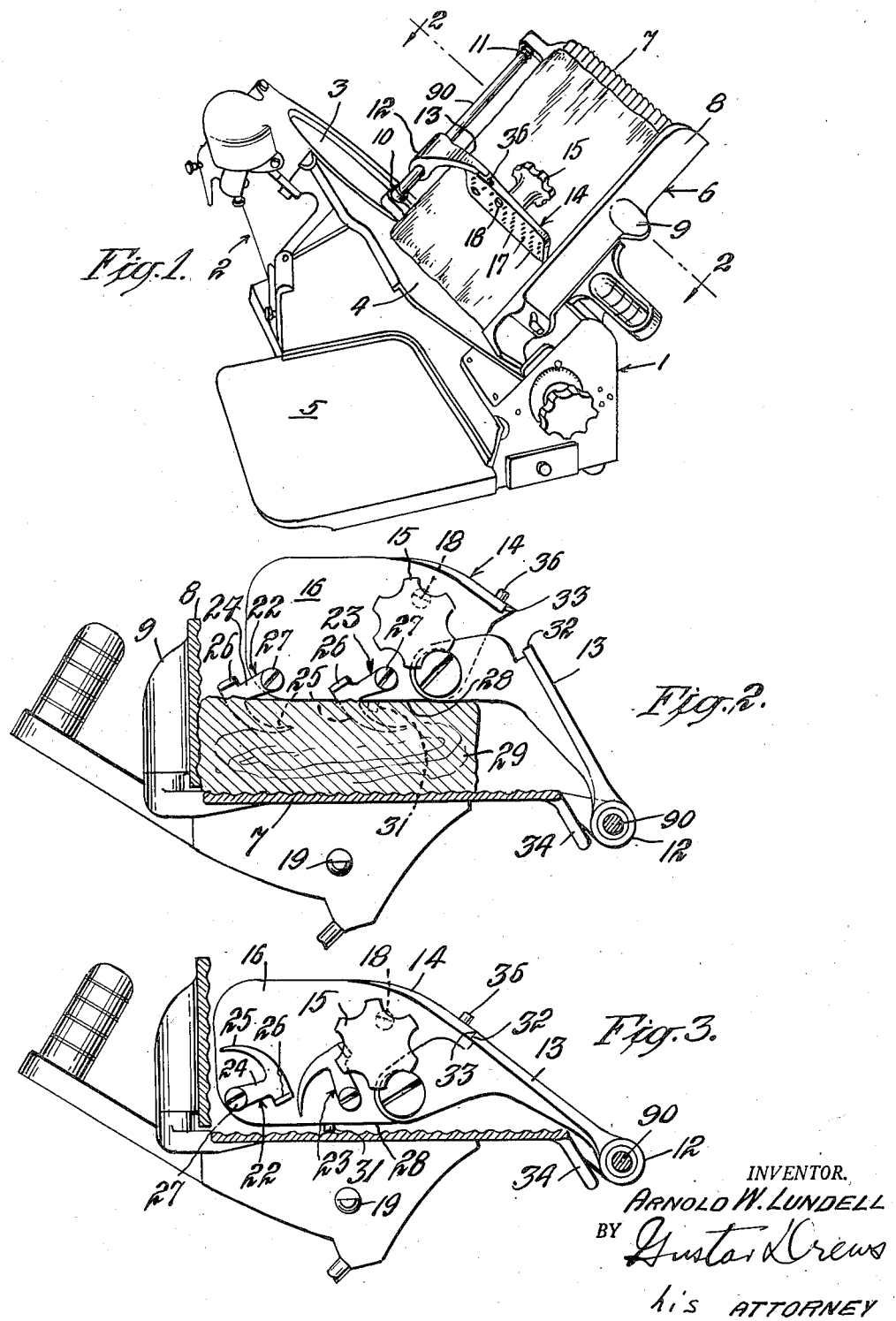
INVENTOR.
ARNOLD W. LUNDELL
BY Gustav Drews
his ATTORNEY

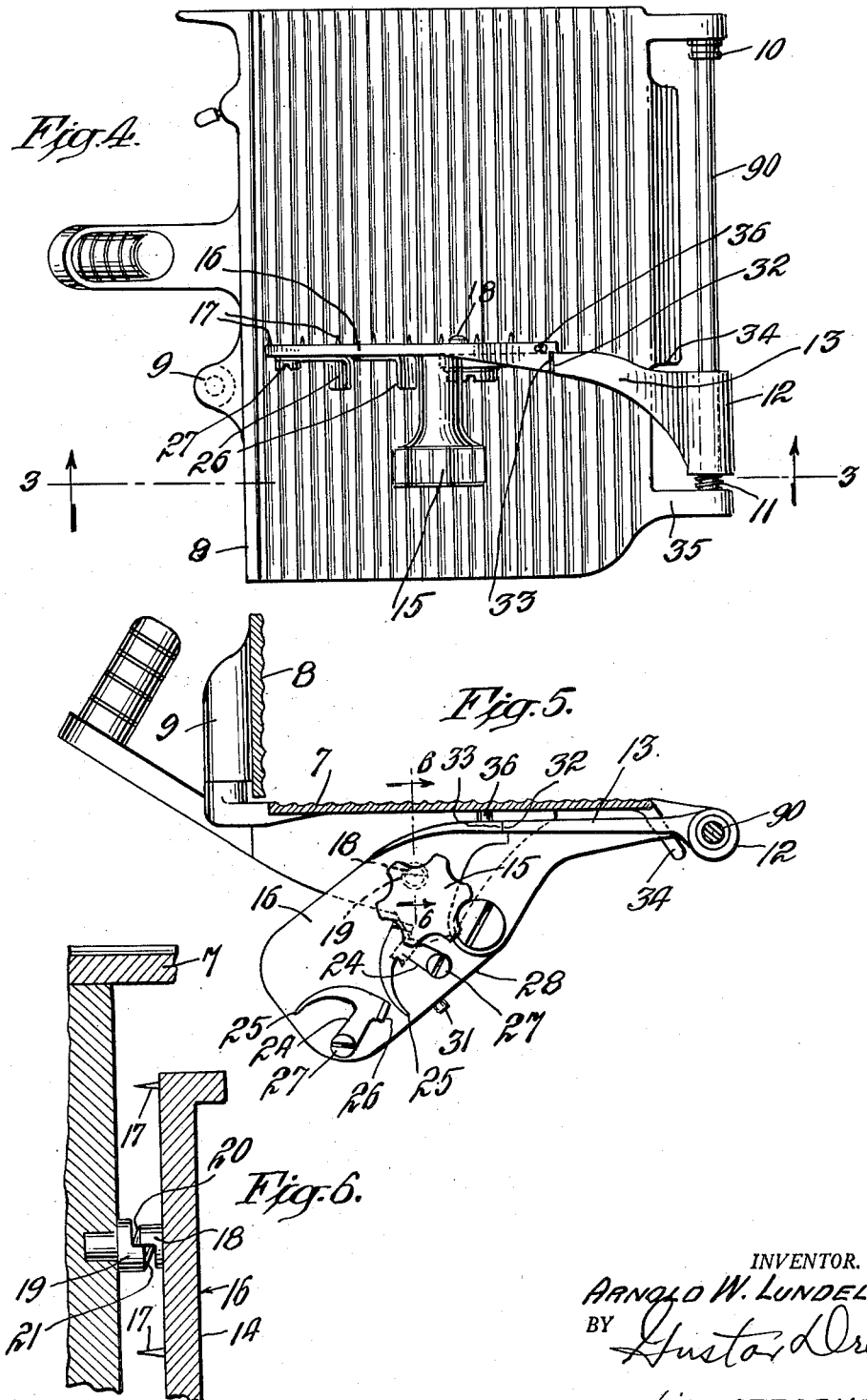

Feb. 4, 1958 A. W. LUNDELL 2,822,011
END WEIGHT FOR SLICING MACHINE
Filed June 1, 1956 3 Sheets-Sheet 3
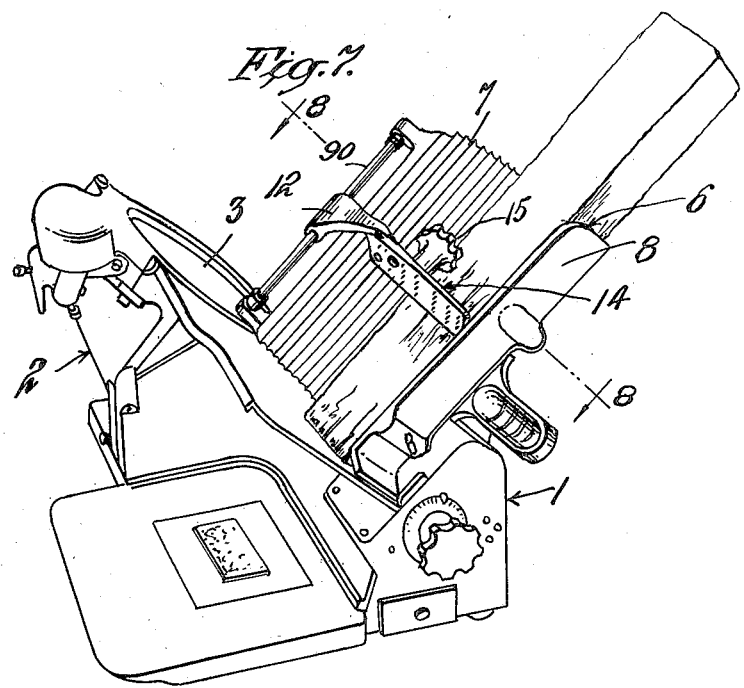
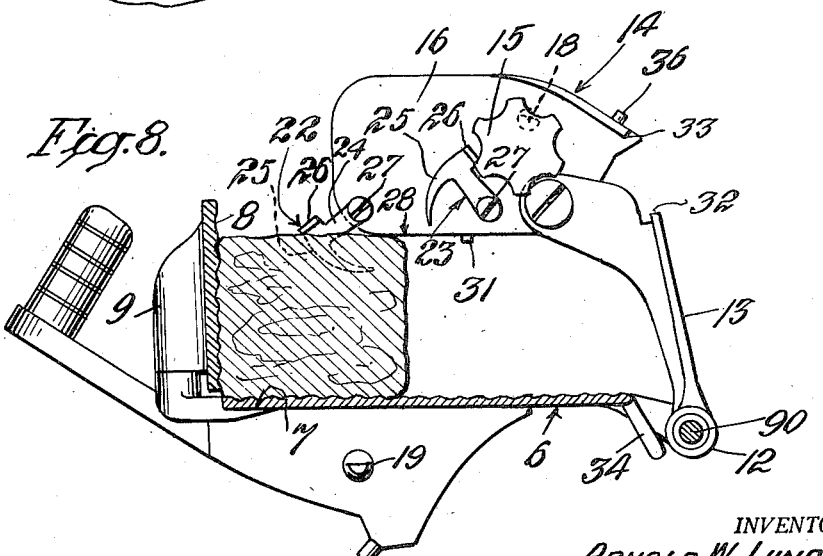
INVENTOR.
ARNOLD W. LUNDELL
BY Gustav Drews
his ATTORNEY United States Patent Office 2,822,011
Patented Feb. 4, 1958

2,822,011

END WEIGHT FOR SLICING MACHINE

Arnold W. Lundell, Byram, Conn., assignor to Globe Slicing Machine Co., Inc., Stamford, Conn., a corporation of New York Application June 1, 1956, Serial No. 588,845

2 Claims. (Cl. 146—102)

This invention relates to slicing machines in general and more especially to end weights for slicing machines.

Among the objects of the present invention it is aimed to provide an improved end weight for a slicing machine of the type illustrated in United States Letters Patent No. 2,740,442 dated April 3, 1956, by which end weight there can effectively be gripped and fed to the knife a long piece of meat, such as a bologna, which generally is longer than the height of the conventional conveyor or chute.

Still furthermore, with the automatic machine such as disclosed in the aforesaid patent, at the ends of the horizontal travel of the chute or conveyor, the conventional end weight is not heavy enough effectively to hold the commodity or piece of meat from chattering, particularly if the meat is tough or only moderately tough, and the prongs at the lower ends of the end weight do not effectively grip the meat. With this in mind, the present invention aims to provide a gripping means for an end weight which may effectively transmit pressures of the commodity being sliced onto three surfaces and the meat thereby in turn effectively anchored against accidental disengagement with the end weight and consequently the meat, whether long, short or intermediate, will in turn be effectively anchored against chattering at the ends of travel of the chute or conveyor.

Still furthermore, due to the pivotal relation of the end weight to the bracket which is pivotally connected to the chute or conveyor, the improved end weight is extremely flexible to accommodate not only meat pieces of extremely narrow width, but also meat pieces that are comparatively wide. As an instance, if the meat piece is wide in one direction, two prongs may be inserted into one side of the meat as shown in Fig. 2. On the other hand, if the meat piece, such as a bologna, is round or narrow in width as well as thickness, then only one prong may engage the meat as shown in Fig. 8.

These and other features, capabilities and advantages of the invention will appear from the subjoined detailed description of one specific embodiment thereof illustrated in the accompanying drawings, in which Fig. 1 is a perspective of a slicing machine equipped with the improved end weight.

Fig. 2 is a fragmental cross section on the line 2—2 of Fig. 1 of the chute showing the end weight in one position engaging only one side of a meat piece.

Fig. 3 is a fragmental cross section on the line 3—3 of Fig. 4 of the chute showing the end weight resting in the chute without a meat piece.

Fig. 4 is a top view of the chute showing the end weight positioned in the chute in a raised position ready to receive a meat piece.

Fig. 5 is a fragmental cross section similar to Fig. 3 of the chute with the end weight anchored in inoperative position.

Fig. 6 is a partial cross section on the line 6—6 of Fig. 5

Fig. 7 is a perspective similar to Fig. 1 showing an elongated piece of bologna or the like in operative position.

Fig. 8 is a fragmental cross section on the line 8—8 of Fig. 7 showing the end weight engaging the bologna or the like shown in Fig. 7.

In the embodiment shown a slicing machine, such as disclosed in United States Letters Patent No. 2,740,442 aforesaid, is shown as provided with a frame 1 having an extension 2 in which is rotatably mounted the knife 3 substantially parallel to the gauge plate 4, which knife 3 and gauge plate 4 are disposed at an acute angle to the horizontal to enable the slices as they are cut by the knife 3 to drop upon the platform 5, or a dish or the like disposed above the platform but below the knife 3 and gauge plate 4.

On the frame 1 there is slidably mounted the chute or conveyor 6 to receive the meat piece or commodity sliced and convey it to and from the knife 3.

The conveyor 6 consists of the main rigidly mounted wing 7 and the wing 8 pivotally mounted by means of the journal 9 to the wing 7. The wings 7 and 8 form a dihedral angle with one another. The wing 8 is mounted adjacent one edge of the wing 7 normally with the wing 8 substantially vertical to the gauge plate 4 across which the chute 6 is reciprocated. Adjacent to the other edge of, and on, the wing 7, there is mounted the pin or rail 90, at the lower end of which there is mounted the yieldable cushion 10 and at the upper end of which there is mounted the coil spring 11. Between the cushion 10 and spring 11 on the pin 90 there is slidably mounted the journal 12 of the arm 13. The arm or bracket 13 in turn has pivotally mounted on it the body or end weight 14 which has extending from its upper end the knob 15 forming a grip for the end weight 14. The end weight 14 consists essentially of a plate 16 having a plurality of fixed prongs 17 extending from its lower face to engage the upper face or rear end of a meat piece or the like when the plate 16 is disposed directly above the meat piece being sliced, when in turn the plate 16 would assume the position relative to the wings 7 and 8 shown in Fig. 3 and have its prongs 17 extend into the meat piece. Also extending from the lower face of the plate 16 there is provided the anchoring button 18 with the prongs 17 disposed in parallel rows, the button 18 is disposed between two of such parallel rows of prongs 17 so that the prongs 17 would clear the complemental anchoring button 19 on the rear face of the wing 7.

The buttons 18 and 19 are each a semi-circular segment which complement one another when their flat sides engage one another. The upper circular portions 20 and 21 of the buttons 18 and 19, respectively, are chamfered so that they readily slide over one another in the portion now to be described.

When the arm 13 and plate 16 of the end weight 14 are nested in extended position, that shown in Fig. 3, it may be swung around the wing 7 into the inoperative position shown in Fig. 5 when the chamfered face of the button 18 will ride over the chamfered face of the button 19 until the flat faces of the buttons 18 and 19 register and engage one another, there being sufficient tension in the parts to urge the end weight 14 toward the wing 7 into the position shown in Fig. 6, and to urge the flat faces of the buttons 18 and 19 into intimate engagement with one another.

The plate 16 is equipped with two hooks 22 and 23, in shape resembling a scythe or the claw end of a claw hammer. These hooks 22 and 23 are each characterized by a shank or arm 24, an arcuate tapering portion or piercing prong 25 and a plate formed finger tab 26 extending substantially vertically to the plate 16. The shanks 24 extend substantially radially from the portions 25 and are pivotally connected at 27, at their outer free ends, to the plate 16, with the arc of the portions 25 disposed in a circle, that is, substantially equi-distant from the pivotal point 27. The pivotal points 27 are disposed adjacent the edge 28 of the plate 16. The upper face of the plate 16 is cleared of any obstruction to enable the hooks 22 and 23 to be superimposed on the plate 16 in inoperative position. In turn, in operative position, that shown in Figs. 1 and 2, the arcuate portions 25 clear the plate 16 and pierce the commodity or meat piece to be supported by the chute 6. In the case of a flat wide piece of meat as shown in Fig. 2, the arcuate portions 25 enter one side only of the piece of meat 29. When, however, as shown in Figs. 7 and 8, the end weight is used with a bologna 30 which may have a comparatively small width, then only one arcuate portion 25 engages the bologna 30.

With this construction two decided advantages are achieved. Due to the toughness of meat, even though the piece of meat to be sliced in height is less than the height of the wing 7, the prongs 17 will not effectively hold the meat in position against chattering or jumping at the ends of the stroke of an automatic slicing machine such as disclosed in United States Letters Patent No. 2,740,442. Furthermore, if the end weight were pressed vigorously into such meat, it would leave objectionable looking scars or openings in the meat. When, as shown in Fig. 2, the two arcuate portions 25 enter the meat due to the fact that all parts of the arcuate portions 25 are equi-distant from their respective pivotal points 27, only two slight arcuate cuts about 90° of an arc will be made in the meat limited by the arms 24 and tabs 26, and the meat not torn or disfigured. Due to length of the arcuate portions 25 in turn and the fact that now the end weight 14, including the arm 13, plate and accessories, will now rest on the meat, see Fig. 2, they will not only press the meat into frictional contact with the two wings 7 and 8, but also with the gauge plate 4. When the meat was formerly merely anchored in place by the prongs 17, frequently the meat was only pressed into frictional contact with the gauge plate 4, not infrequently entirely clearing the inner face of the wing 8 and sometimes in the course of the slicing of the meat, the edge of the end weight would rest against the wing 7 and the meat anchored to the end weight by the prongs 17 would actually be spaced from the wing 7 and therefore only have frictional contact with the gauge plate 4. Since the engagement with the gauge plate 4 is intermittent due to the fact that as a slice is cut from the bottom of the meat a new fresh surface is exposed, the piece of meat at the ends of the cutting stroke at least can for a moment be entirely free of frictional contact with any surface. As a result of this momentary freedom at the end of a stroke, experience has shown that the meat or commodity will chatter or jump at such time and sometimes actually leave the chute 6 entirely.

Another great advantage made possible by the present end weight is that when an elongated bologna or elongated piece of bologna is to be sliced which is longer than the length or rather height of the wings 7 and 8, and it is desired to rely upon an end weight to position the bologna on the chute 6 for slicing, then as shown in Figs. 7 and 8 the end weight 14 is raised to its uppermost position, the bologna 30 positioned, and only one arcuate portion 25 pierced into the bologna 30 as shown.

In this case preferably the outer arcuate portion 25 alone will pierce the outer face of the bologna 30 and the inner arcuate portion 25 will rest idly on the plate 16 as shown in Fig. 8. In this position the bologna 30 will have frictional contact with the inner faces of the wings 7 and 8, and of course also with the upper face of the gauge plate 4.

Preferably as shown, the plate 16 will have a fiber button 31 extending from its edge 28 so that it will contact the inner face of the wing 7 as shown in Fig. 3, when the end weight 14 has its plate 16 and arm 13 extended as shown in Fig. 3, and the prongs 17 are relied upon to engage the commodity or meat piece.

The stop 11 is preferably composed of some yieldable substance such as spring fiber, rubber or the like.

Preferably as shown in the extended position of the plate 16 and arm 13 of the end weight 14, when the end weight 14 assumes the position shown in Fig. 3, its button 31 will rest on the inner face of the wing 7 and the edge of the plate 16 adjacent the wing 8 will just clear it. In turn, when the arm 13 is bent relative to the plate 16 as shown in Fig. 2, there will be afforded sufficient clearance between the plate 16 and the wing 8 so that the outer arcuate portion 25 may be swung into gripping engagement with the commodity to be sliced.

To facilitate operation of the end weight 14 into out of operative position when the plate 16 is extended relative to the arm 13, the arm 13 and plate 16 will have opposing shoulders 32 and 33, respectively.

Also to facilitate anchoring the end weight 14 in the inoperative position shown in Fig. 5, the wing 7 is provided with a clearance between the shoulder 34 and the arm 35 for the journal 12 of the arm 13.

Preferably as shown in Figs. 2, 3, 4, 5 and 8, the plate 16 of the end weight 14 adjacent the shoulder 33 is provided with a fiber button 36 to engage the rear face of the wing 7, as shown in Fig. 5, when the end weight 14 is swung into inoperative position.

It is obvious that various changes and modifications may be made to the details of construction without departing from the general spirit of the invention as set forth in the appended claims.

I claim:

1. In a slicing machine having a chute, said chute having an upwardly extending wing and a rail extending along the edge of said wing, an end weight having a bracket including a first arm slidably mounted on said rail, a plate pivotally connected to said first arm extending substantially at right angles to said wing and with one edge adjacent to said wing, hook means pivotally mounted on said plate adjacent said edge of said wing in position to pierce the commodity being sliced through the adjacent exposed face of the commodity and holding the commodity being sliced between said plate and wing, the hook means having a second arm, an arcuate piercing prong at one end of said second arm substantially a 90° arc in angular length, a pivotal connection between said plate and the other end of said second arm, and a finger engaging plate formed tab at one end of said piercing prong extending substantially vertically to said plate, the arc of the inner edge of said piercing prong being substantially equi-distant from said pivotal connection determined by said second arm, and said second arm and tab forming stops adapted to engage the pierced face of the commodity.

2. In a slicing machine having a chute, said chute having an upwardly extending wing and a rail extending along the edge of said wing, an end weight having a bracket including a first arm slidably mounted on said rail, a plate pivotally connected to said first arm, extending substantially at right angles to said wing and with one edge adjacent to said wing, hook means pivotally mounted on said plate adjacent said edge of said wing in position to pierce the commodity being sliced through the adjacent exposed face of the commodity and holding the commodity being sliced between said plate and wing, the hook means having a plurality of second arms, an arcuate piercing prong at one end of each of said second arms substantially a 90° arc in angular length, a pivotal connection between said plate and the other end of each of said arms, and a finger engaging plate formed tab at one end of each of said piercing prongs extending substantially vertically to said plate, the arc of the inner edge of each of said piercing prongs being substantially equi-distant from the pivotal connection of its associated prong determined by its associated second arm, and said second arms and tabs forming stops adapted to engage the pierced face of the commodity.

References Cited in the file of this patent

UNITED STATES PATENTS

| | | |
|---|---|---|
| 2,058,519 | Sivertsen | Oct. 27, 1936 |
| 2,126,421 | Stukart | Aug. 9, 1938 |
| 2,573,861 | Meeker et al. | Nov. 6, 1951 |